US012020576B2

(12) United States Patent
Ogata

(10) Patent No.: US 12,020,576 B2
(45) Date of Patent: Jun. 25, 2024

(54) PLATOONING VEHICLE MANAGEMENT DEVICE, VEHICLE MANAGEMENT METHOD, AND STORAGE MEDIUM

(71) Applicant: NEC Corporation, Tokyo (JP)

(72) Inventor: Kazuki Ogata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 385 days.

(21) Appl. No.: 17/428,126

(22) PCT Filed: Jan. 29, 2020

(86) PCT No.: PCT/JP2020/003168
§ 371 (c)(1),
(2) Date: Aug. 3, 2021

(87) PCT Pub. No.: WO2020/162282
PCT Pub. Date: Aug. 13, 2020

(65) Prior Publication Data
US 2022/0058956 A1    Feb. 24, 2022

(30) Foreign Application Priority Data
Feb. 4, 2019 (JP) .................. 2019-018091

(51) Int. Cl.
*G08G 1/00*    (2006.01)
*G08G 1/01*    (2006.01)
*G08G 1/0967*    (2006.01)

(52) U.S. Cl.
CPC ............. *G08G 1/22* (2013.01); *G08G 1/0116* (2013.01); *G08G 1/096783* (2013.01); *G08G 1/205* (2013.01)

(58) Field of Classification Search
CPC .. G08G 1/22; G08G 1/0116; G08G 1/096783; G08G 1/205
USPC ......................................................... 701/117
See application file for complete search history.

(56) References Cited

U.S. PATENT DOCUMENTS

| 6,356,820 | B1 * | 3/2002 | Hashimoto | ............. G08G 1/22 |
| | | | | 180/170 |
| 6,619,593 | B1 * | 9/2003 | Callahan | ............... B61L 29/246 |
| | | | | 246/115 |
| 7,042,345 | B2 * | 5/2006 | Ellis | ..................... G09B 21/006 |
| | | | | 340/436 |
| 11,084,418 | B2 * | 8/2021 | Hong | ....................... B60Q 1/54 |
| 11,145,197 | B2 * | 10/2021 | Guo | ..................... G08G 1/0145 |

(Continued)

FOREIGN PATENT DOCUMENTS

JP    H11321380 A    11/1999
JP    2002269692 A    9/2002

(Continued)

OTHER PUBLICATIONS

International Search Report for PCT Application No. PCT/JP2020/003168, dated Apr. 7, 2020.

*Primary Examiner* — Richard A Goldman
(74) *Attorney, Agent, or Firm* — Sughrue Mion, PLLC

(57) ABSTRACT

A vehicle management device detects a traveling position that is a position in which a convoy is traveling. The convoy is constituted by vehicles that are lined up. The vehicle management device determines a platooning notification device based on the traveling position and requests the platooning notification device to output notification information about the convoy.

7 Claims, 6 Drawing Sheets

(56) References Cited

U.S. PATENT DOCUMENTS

| | | | |
|---|---|---|---|
| 11,294,396 B2* | 4/2022 | Switkes | B62D 15/026 |
| 11,450,212 B2* | 9/2022 | Domprobst | B60W 40/064 |
| 2002/0126022 A1* | 9/2002 | Ellis | G01S 13/89 |
| | | | 340/904 |
| 2006/0080004 A1* | 4/2006 | Cheok | G01C 15/14 |
| | | | 701/1 |
| 2008/0195265 A1* | 8/2008 | Searle | B61L 15/0081 |
| | | | 701/19 |
| 2010/0141477 A1* | 6/2010 | Lim | G08G 1/081 |
| | | | 340/906 |
| 2010/0290378 A1* | 11/2010 | Wu | H04W 52/0216 |
| | | | 370/311 |
| 2011/0109478 A1* | 5/2011 | Williamson | G08G 1/087 |
| | | | 340/906 |
| 2011/0187559 A1* | 8/2011 | Applebaum | G08G 1/087 |
| | | | 340/540 |
| 2013/0080041 A1* | 3/2013 | Kumabe | G05D 1/024 |
| | | | 701/117 |
| 2013/0124064 A1* | 5/2013 | Nemoto | B60K 31/0058 |
| | | | 701/1 |
| 2014/0209752 A1* | 7/2014 | Myokei | B61L 27/53 |
| | | | 246/27 |
| 2014/0316865 A1* | 10/2014 | Okamoto | G05D 1/0293 |
| | | | 705/14.1 |
| 2017/0103271 A1* | 4/2017 | Kawagoe | B60Q 9/008 |
| 2018/0211546 A1* | 7/2018 | Smartt | G06F 21/30 |
| 2018/0222506 A1* | 8/2018 | Kranz | B61L 23/04 |
| 2018/0278385 A1* | 9/2018 | Wu | H04W 16/10 |
| 2018/0374367 A1* | 12/2018 | Jornod | G08G 1/22 |
| 2019/0220037 A1* | 7/2019 | Vladimerou | G05D 1/0293 |
| 2019/0279513 A1* | 9/2019 | Schuh | G08G 1/22 |
| 2020/0074862 A1* | 3/2020 | Johnston | G08G 1/22 |
| 2020/0092685 A1* | 3/2020 | Fehrenbach | H04W 84/047 |
| 2020/0125086 A1* | 4/2020 | Switkes | B60T 7/22 |
| 2020/0178198 A1* | 6/2020 | Ding | H04W 60/04 |
| 2020/0298882 A1* | 9/2020 | Kobayashi | B60W 60/0025 |
| 2021/0084460 A1* | 3/2021 | Yang | H04W 4/40 |
| 2021/0090438 A1* | 3/2021 | Lim | G08G 1/162 |
| 2021/0099847 A1* | 4/2021 | Uchiyama | H04W 4/40 |
| 2021/0109545 A1* | 4/2021 | Lopez | G05D 1/0088 |
| 2021/0144736 A1* | 5/2021 | Li | H04W 76/14 |
| 2021/0166566 A1* | 6/2021 | Cuevas Ramirez | H04W 84/02 |
| 2021/0168790 A1* | 6/2021 | Li | H04L 1/1893 |
| 2021/0191414 A1* | 6/2021 | Tolstov | B64F 1/007 |
| 2021/0219110 A1* | 7/2021 | Kousaridas | H04W 4/70 |
| 2021/0394797 A1* | 12/2021 | Ran | B60W 60/0027 |
| 2022/0045798 A1* | 2/2022 | Tang | H04L 5/0053 |
| 2022/0046640 A1* | 2/2022 | Tang | H04L 5/1469 |
| 2022/0058956 A1* | 2/2022 | Ogata | G08G 1/205 |
| 2022/0141824 A1* | 5/2022 | Bao | H04W 4/46 |
| | | | 370/329 |
| 2022/0327935 A1* | 10/2022 | Guney | G08G 1/22 |
| 2023/0046442 A1* | 2/2023 | Uchiyama | H04W 4/40 |
| 2023/0072230 A1* | 3/2023 | Peranandam | B60W 40/12 |
| 2023/0080076 A1* | 3/2023 | Lei | B60W 40/02 |
| | | | 701/117 |

FOREIGN PATENT DOCUMENTS

| | | |
|---|---|---|
| JP | 2003029834 A | 1/2003 |
| JP | 2003044994 A | 2/2003 |
| JP | 2010087733 A | 4/2010 |
| JP | 2010231317 A | 10/2010 |
| JP | 2019191950 A | 10/2019 |
| WO | 2018135630 A1 | 7/2018 |

* cited by examiner

PLATOONING VEHICLE MANAGEMENT DEVICE, VEHICLE MANAGEMENT METHOD, AND STORAGE MEDIUM

This application is a National Stage Entry of PCT/JP2020/003168 filed on Jan. 29, 2020, which claims priority from Japanese Patent Application 2019-018091 filed on Feb. 4, 2019, the contents of all of which are incorporated herein by reference, in their entirety.

TECHNICAL FIELD

The present invention relates to a vehicle management device, a vehicle management method, and a storage medium.

BACKGROUND ART

In recent years, a technology for causing vehicles to travel in a convoy has been studied. By causing vehicles to travel in a convoy, effects such as an improvement of vehicle fuel efficiency and an increase in transportation volume are expected. On a road where a plurality of vehicles travel in a convoy, it can be difficult for non-convoy vehicles to enter a lane. For example, if a vehicle sequence that travels in a convoy on a main line of a road is long, it will be difficult for other vehicles to enter the main line from an entrance ramp until the last vehicle traveling in the convoy passes.

Patent Document 1 discloses, as a related technology, a technology capable of notifying of a plurality of vehicles traveling in a convoy and a status of platooning in the surrounding while the vehicles are traveling in the convoy. In this technology, a notification means for notifying, by one or more of the plurality of vehicles forming a convoy, notification targets such as other vehicles traveling in the vicinity of platooning information is provided.

PRIOR ART DOCUMENTS

Patent Documents

[Patent Document 1]
PCT International Publication No. WO 2018/135630

SUMMARY OF THE INVENTION

Problem to be Solved by the Invention

The implementation of platooning as described above also requires desired other vehicles to be alerted according to the position of platooning.

An example object of the present invention is to provide a vehicle management device, a vehicle management method, and a storage medium that solve the problems described above.

Means for Solving the Problem

According to a first example aspect of the present invention, a vehicle management device includes: a platooning detection means for detecting a traveling position that is a position in which a convoy is traveling, the convoy being constituted by vehicles that are lined up; a determination means for determining a platooning notification device based on the traveling position; and a request means for requesting the platooning notification device to output notification information about the convoy. ¥

In addition, according to a second example aspect of the present invention, a vehicle management method includes: detecting a traveling position that is a position in which a convoy is traveling, the convoy being constituted by vehicles that are lined up; determining a platooning notification device based on the traveling position; and requesting the platooning notification device to output notification information about the convoy.

Moreover, according to a third example aspect of the present invention, a storage medium that stores a program causing a computer to execute: detecting a traveling position that is a position in which a convoy is traveling, the convoy being constituted by vehicles that are lined up; determining a platooning notification device based on the traveling position; and requesting the platooning notification device to output notification information about the convoy.

Effect of the Invention

According to example embodiments of the present invention, it is possible to alert desired other vehicles according to the position of platooning that the platooning is being implemented.

EXAMPLE EMBODIMENT

In the following description, a vehicle management device according to example embodiments of the present invention will be described with reference to the drawings.

Figure 1:
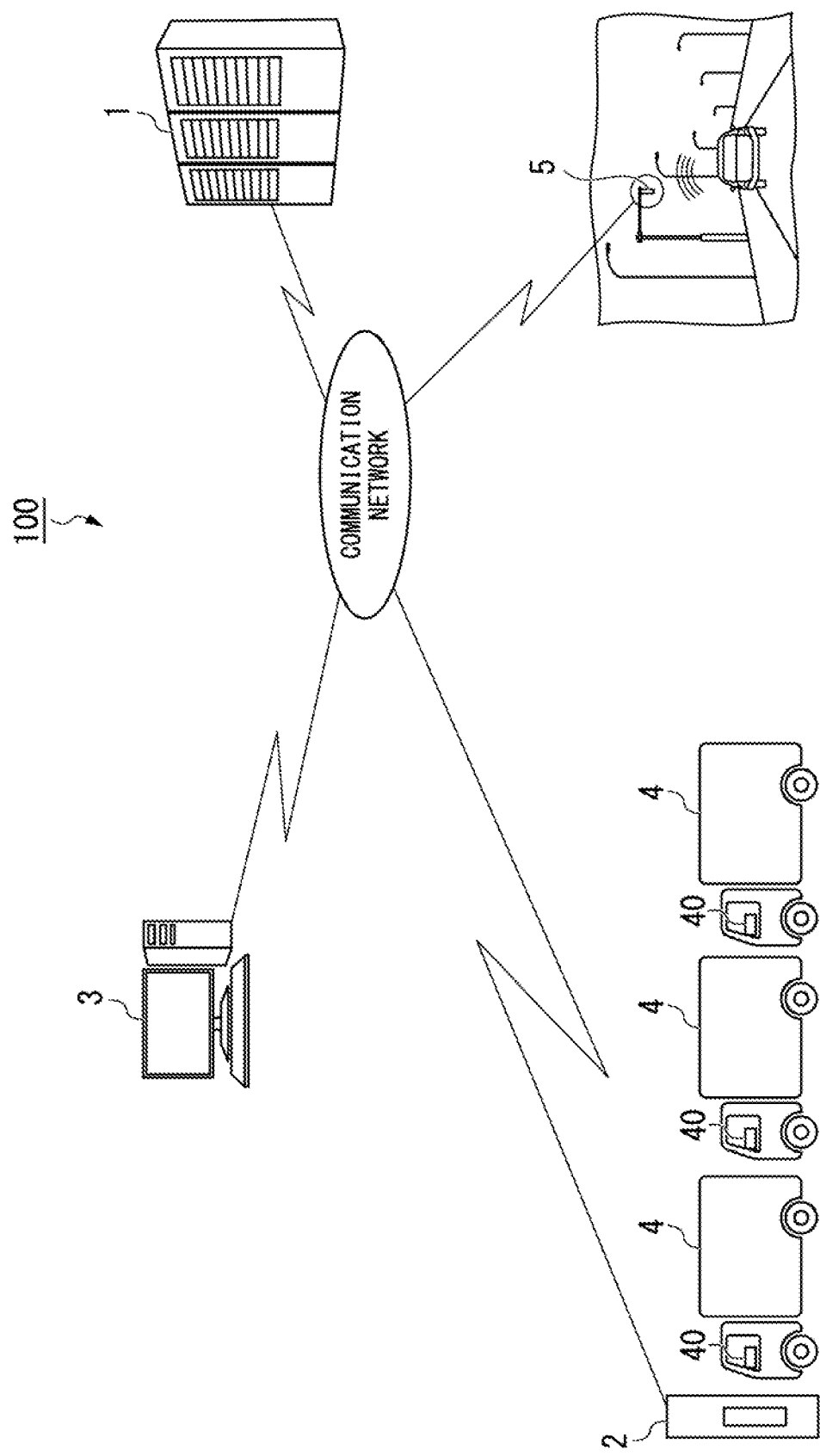
FIG. 1 is a diagram which shows a configuration of a vehicle management system according to an example embodiment of the present invention.

FIG. 1 is a diagram which shows a configuration of a vehicle management system 100 including a vehicle management device 1 according to an example embodiment of the present invention.

As shown in FIG. 1, the vehicle management system 100 includes, as an example, a vehicle management device 1, a roadside machine 2, a terminal 3, and a transmitter 5.

The vehicle management device 1 is communicatively connected to the roadside machine 2, the terminal 3, and the transmitter 5.

The roadside machine 2 is installed on the shoulder or the like of a road on which vehicles 4 travel in a convoy. The roadside machine 2 has a passage detection function for detecting that the vehicles 4 have passed, and a communication function for communicating with an in-vehicle device 40 mounted in the vehicles 4 and the vehicle management device 1. The roadside machine 2 transmits information received from the in-vehicle device 40 to the vehicle management device 1 on the basis of a communicative connection to the in-vehicle device 40. In addition, the roadside machine 2 can transmit the information received from the vehicle management device 1 to the in-vehicle device 40.

In this example embodiment, it is assumed that the in-vehicle device 40 has a function for implementing traveling of the vehicles 4 equipped with the in-vehicle devices 40 in a convoy. For example, the in-vehicle device 40 may have a function of detecting, for traveling behind a vehicle 4 (a vehicle in front) participating in platooning at a position immediately before the vehicle 4 in which the in-vehicle device 40 is mounted, a distance and a position to the vehicle in front, a function of controlling transmission/reception of a radar for performing this detection, and a function of controlling a speed and a traveling direction of the vehicles 4 on the basis of a result of the detection. Moreover, the in-vehicle device 40 may have a function for performing each type of processing for implementing traveling of the vehicles 4 in which the in-vehicle devices 40 are mounted in a convoy on the basis of the information received from the vehicle management device 1. It is assumed that the in-vehicle device 40 uses a known technology for processing for causing the vehicles 4 to implement platooning.

A terminal 3 manages the vehicles 4 traveling in a convoy. In addition, the terminal 3 is used by an applicant who applies for platooning of the vehicles 4. The applicant uses the terminal 3 to apply for implementation of platooning in which a plurality of vehicles 4 travel in a convoy. The terminal 3 generates application information on the implementation of platooning on the basis of an operation of the applicant and sends it to the vehicle management device 1. The terminal 3 is, for example, a personal computer or a mobile terminal.

The transmitter 5 communicates with the in-vehicle device 40 using a wireless technology called DSRC (dedicated short range communications). The transmitter 5 communication-connects with the vehicle management device 1, receives notification information about the convoy of the vehicles 4 traveling in a convoy from the vehicle management device 1, and notifies the in-vehicle device 40 of the notification information. The transmitter 5 is an aspect of the platooning notification device.

Figure 2:
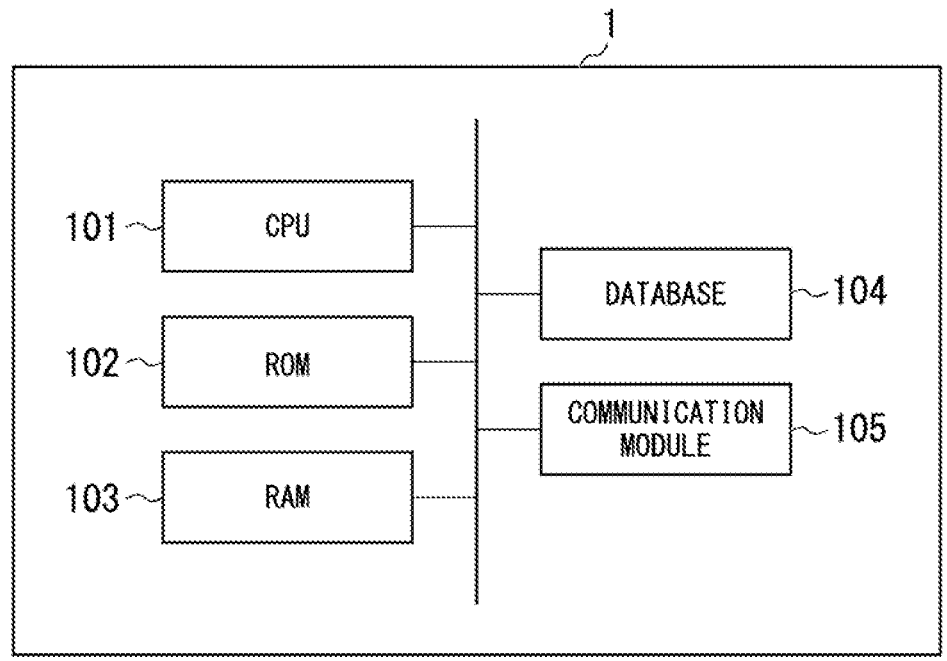
FIG. 2 is a hardware configuration diagram of a vehicle management device according to the example embodiment of the present invention.

FIG. 2 is a hardware configuration diagram of the vehicle management device 1. As shown in FIG. 2, the vehicle management device 1 is a computer that includes hardware such as a CPU (central processing unit) 101, a ROM (read only memory) 102, a RAM (random access memory) 103, a database 104, and a communication module 105.

Figure 3:
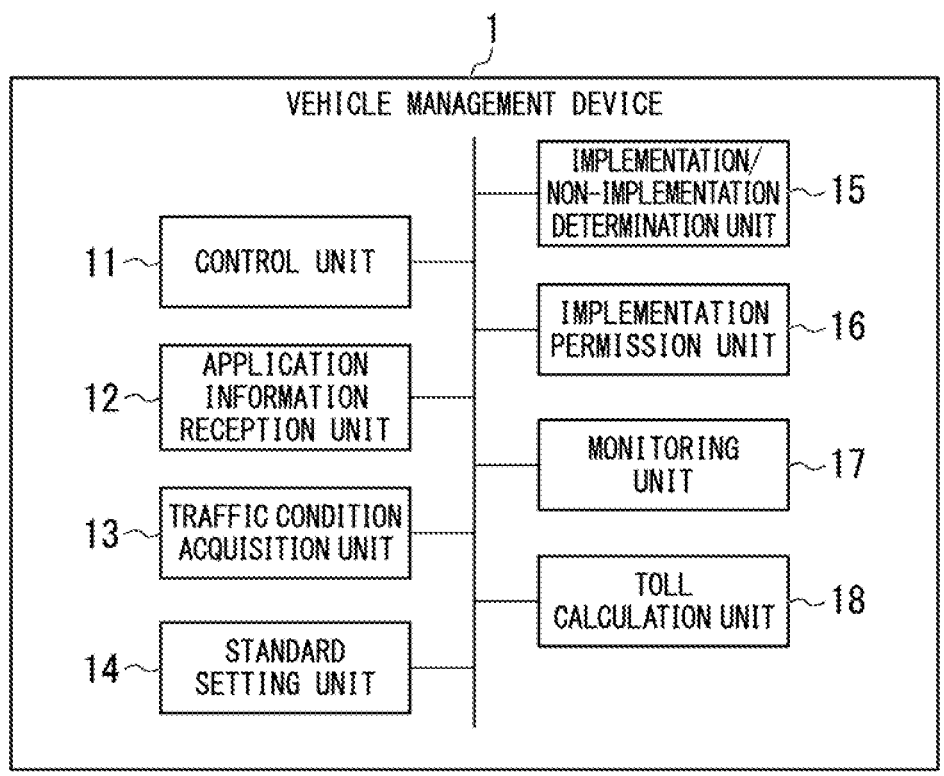
FIG. 3 is a functional block diagram of the vehicle management device according to the example embodiment of the present invention.

FIG. 3 is a functional block diagram of the vehicle management device 1.

The vehicle management device 1 starts when a power supply is turned on, and executes a management program stored in advance. As a result, the vehicle management device 1 exhibits each function of a control unit 11, an application information reception unit 12, a traffic condition acquisition unit 13, a standard setting unit 14, an implementation/non-implementation determination unit 15, an implementation permission unit 16, a monitoring unit 17, and a toll calculation unit 18.

The control unit 11 controls each functional unit of the vehicle management device 1.

The application information reception unit 12 receives application information for platooning of a plurality of vehicles 4.

The traffic condition acquisition unit 13 acquires traffic condition information related to a road on which platooning is implemented.

The standard setting unit 14 sets a standard for platooning on the basis of traffic condition information.

The implementation/non-implementation determination unit 15 determines whether the implementation of platooning based on application information is possible.

The implementation permission unit 16 permits implementation of platooning on the basis of a result of the determination on whether the implementation is possible.

The monitoring unit 17 monitors whether the platooning of the vehicles 4 matches a convoy mode included in the application information. When the platooning of the vehicles 4 matches the convoy mode included in the application information, the monitoring unit 17 determines the transmitter 5 serving as a transmission destination of the notification information on the basis of a traveling position of the convoy, and transmits the notification information to the transmitter 5.

The toll calculation unit 18 calculates a discounted toll when the platooning of the vehicles 4 matches the convoy mode included in the application information.

Figure 4:
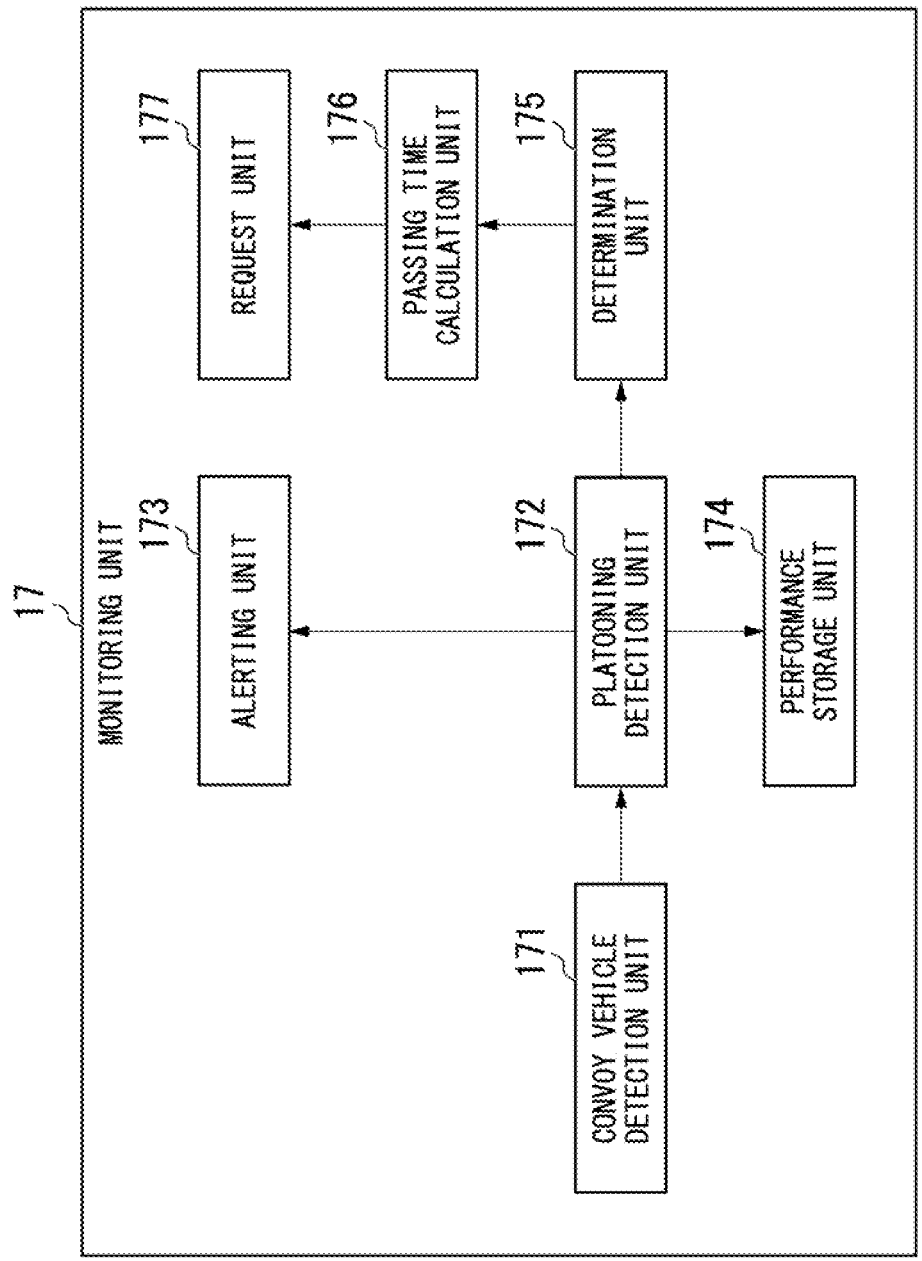
FIG. 4 is a functional block diagram of a monitoring unit according to the example embodiment of the present invention.

FIG. 4 is a functional block diagram of the monitoring unit 17.

As shown in FIG. 4, the monitoring unit 17 further exhibits functions of a convoy vehicle detection unit 171, a platooning detection unit 172, an alerting unit 173, a performance storage unit 174, a determination unit 175, a passing time calculation unit 176, and a request unit 177.

The convoy vehicle detection unit 171 detects vehicles 4 that implement platooning.

The platooning detection unit 172 determines whether the implementation of platooning indicated by application information is possible. When the platooning is being implemented, the platooning detection unit 172 detects a traveling position of a convoy of the platooning.

When it is determined that the platooning of the vehicles 4 is not in an implementation mode of platooning based on the application information, the alerting unit 173 transmits information indicating alerting to these vehicles 4 performing the platooning and/or the terminal 3 used by the applicant who manages these vehicles 4.

The performance storage unit 174 stores a result of the determination by the platooning detection unit 172.

The determination unit 175 determines the transmitter 5 that is a notification destination of the notification information on the basis of the traveling position of a convoy. For example, the determination unit 175 determines the transmitter 5 installed behind the traveling position in a traveling direction of the platooning as a request destination for requesting an output of the notification information to the vehicles 4 in the vicinity of the transmitter 5 on the basis of the traveling position of a convoy. Alternatively, the determination unit 175 identifies a second road, which is another road that joins a first road corresponding to the traveling position of a convoy, and determines the transmitter 5 installed on the second road as a request destination for requesting an output of the notification information.

The passing time calculation unit 176 calculates a passing time of a convoy at a predetermined position. For example, when the determination unit 175 identifies the second road, which is another road that joins a first road corresponding to the traveling position of the convoy, the passing time calculation unit 176 calculates a time at which the convoy passes through a junction of the first road and the second road on the basis of a current traveling position of the convoy.

The request unit 177 requests the transmitter 5 that is the determined notification destination to output the notification information regarding the convoy.

In such a vehicle management system 100, the vehicle management device 1 determines a platooning notification device such as the transmitter 5, which serves as an output destination of notification information, on the basis of the traveling position of the vehicles 4 traveling in the convoy, and requests this platooning notification device to output notification information regarding the convoy. The platooning notification device such as the transmitter 5 outputs the notification information to the vehicles 4 in the vicinity of the own device. As a result, the vehicle management device 1 can alert desired other vehicles according to the position of the platooning that the platooning is being implemented.

Figure 5:
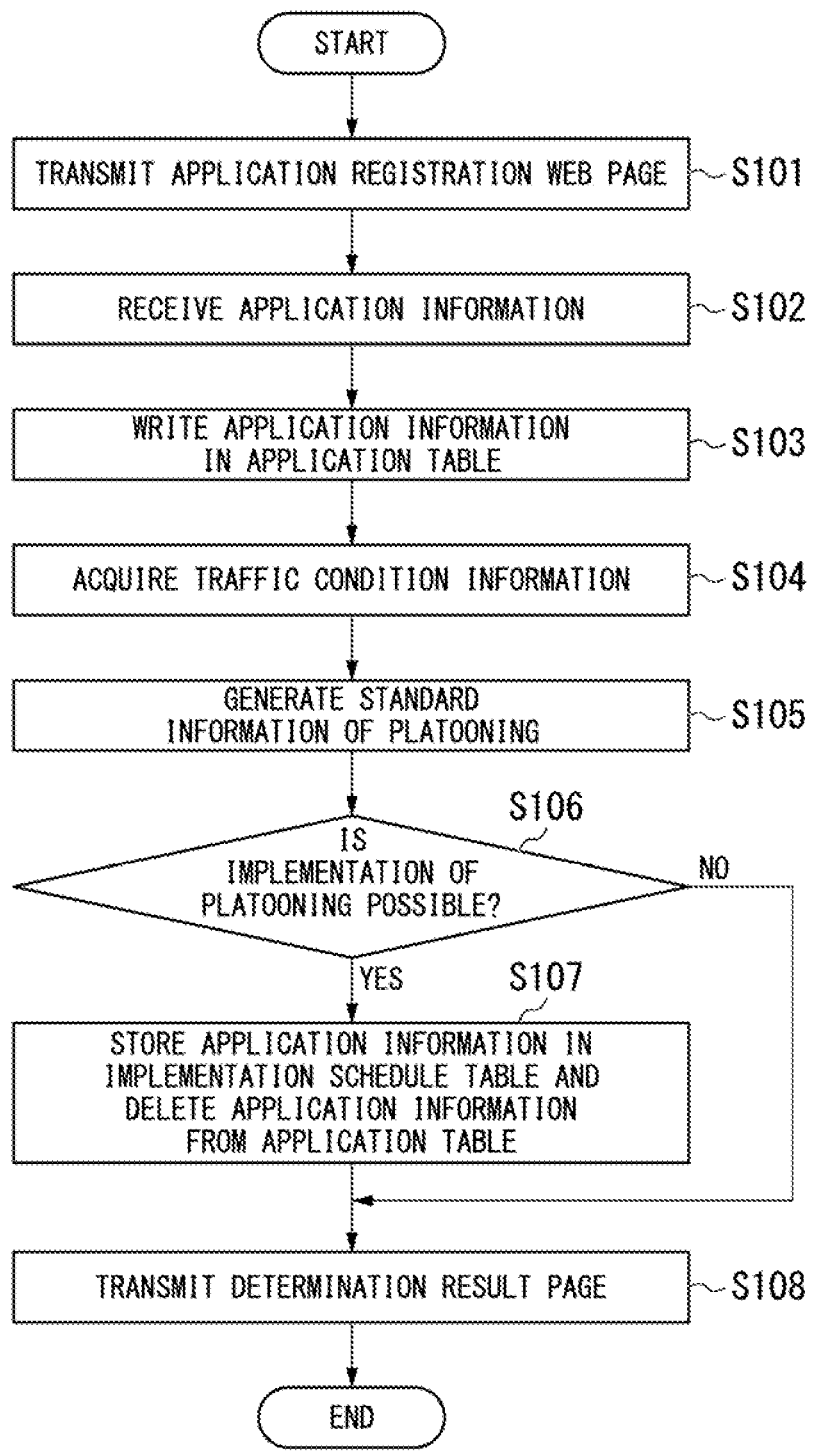
FIG. 5 is a first diagram which shows a processing flow of the vehicle management device according to the example embodiment of the present invention.

FIG. 5 is a first diagram which shows a processing flow of the vehicle management device 1.

Next, the processing flow of the vehicle management device 1 will be described.

First, when the applicant makes a plurality of vehicles 4 that he or she manages perform platooning, he or she applies for platooning using the terminal 3. The vehicles 4 to perform platooning may include vehicles 4 managed by another applicant. In making this application, the applicant causes the terminal 3 to access the vehicle management device 1. The application information reception unit 12 of the vehicle management device 1 detects the access by the terminal 3 and transmits information regarding an application registration web page to the terminal 3 (step S101). That is, the application information reception unit 12 has a function of a web server, and transmits the information regarding an application registration web page to the terminal 3 according to the function. On the application registration web page, input fields such as an applicant number, an in-vehicle device ID (an identifier) for identifying vehicles performing platooning, a number on a license plate, a section in which platooning is performed, a time to implement platooning, the number of vehicles 4 performing platooning, and an order of respective vehicles 4 in a convoy when the vehicles 4 form a convoy, and the like are provided.

The terminal 3 receives information regarding the application registration web page. The terminal 3 outputs the application registration web page on a monitor. The applicant uses an input device such as a mouse or keyboard to input various types of information in the input fields such as an applicant number, an in-vehicle device ID for identifying vehicles 4 performing platooning, a number on a license plate, a section in which platooning is performed, a time to implement platooning, the number of vehicles 4 performing platooning, and an order of respective vehicles 4 in a convoy. The applicant also performs pressing a registration button provided on the application registration web page. Then, the terminal 3 generates application information of platooning including various types of information that was input to the input fields. The terminal 3 transmits application information to the vehicle management device 1. Information on a platooning section included in the application information may include a road ID for identifying a road, coordinates (platooning start coordinates) indicating a position where platooning indicating a platooning section on the road is started, coordinates (platooning end coordinates) indicating a position where platooning ends, and the like.

The vehicle management device 1 receives the application information (step S102). The application information reception unit 12 of the vehicle management device 1 writes the application information on the application table stored in the database 104 (step S103). Moreover, the application information reception unit 12 instructs the implementation/non-implementation determination unit 15 to start determining whether the implementation of platooning based on various types of information included in the application information is possible. Then, the implementation/non-implementation determination unit 15 detects a road ID included in a platooning section, platooning start coordinates of the platooning on a corresponding road, and platooning end coordinates on the basis of a platooning section included in the application information, and outputs the information and a time to implement the platooning (a start time, an end time, and the like) to the traffic condition acquisition unit 13. Moreover, the implementation/non-implementation determination unit 15 outputs information including at least the platooning section included in the application information and the time to implement the platooning to the standard setting unit 14, and instructs the standard setting unit 14 to generate standard information indicating a standard for determining whether the implementation is possible.

The traffic condition acquisition unit 13 acquires the road ID included in the platooning section, the platooning start coordinates of the platooning on the road, the platooning end coordinates, and the time to implement the platooning. The traffic condition acquisition unit 13 generates a traffic condition distribution request including the road ID, the platooning start coordinates of the platooning on the road, the platooning end coordinates, and the time to implement the platooning. The traffic condition acquisition unit 13 transmits a traffic condition distribution request to a traffic condition distribution server that is communicatively connected to the vehicle management device 1. Although not shown in FIG. 1, the traffic condition distribution server is present outside the vehicle management system 100 and is communicatively connected to the vehicle management device 1. The traffic condition distribution server acquires the road ID included in the traffic condition distribution request, the platooning start coordinates of the platooning on the road, the platooning end coordinates, and the time to implement the platooning. The traffic condition distribution server acquires traffic condition information recorded in a database or the like in association with the road ID, platooning start coordinates of platooning on the road, platooning end coordinates, and time to implement platooning. The traffic condition information may include, for example, an expected degree of congestion (the number of vehicles traveling per unit time, or the like), a presence or absence of expected traffic congestion, and the like. The traffic condition information may include information such as a condition of a road surface and a shape of a road (branched/not branched, approach road/no approach road). The traffic condition information may include a road ID, platooning start coordinates of platooning on the road, platooning end coordinates, and weather information according to an area and time identified by the time to implement platooning (information indicating sunny weather, cloudy weather, rain, snow, a typhoon, or the like). The degree of congestion, the presence or absence of traffic congestion, the shape of the road, and the weather information may be information acquired from other devices in advance or information calculated on the basis of information obtained from various sensors in advance and registered in the own device (the traffic condition distribution server). The traffic condition information may include the preset number of vehicles capable of platooning (the number of vehicles capable of traveling in a convoy) for a road identified by a road ID, platooning start coordinates, platooning end coordinates, and the like.

The traffic condition distribution server transmits the acquired traffic condition information to the vehicle management device 1. The vehicle management device 1 receives the traffic condition information. The traffic condition acquisition unit 13 of the vehicle management device 1 acquires the traffic condition information (step S104). The vehicle management device 1 may have a function of the traffic condition distribution server. That is, the vehicle management device 1 may acquire and store the traffic condition information in advance, or may calculate the traffic condition information. The traffic condition acquisition unit 13 outputs the traffic condition information, the platooning section, and the time for implementing platooning to the standard setting unit 14. The standard setting unit 14 acquires information such as the degree of congestion, the presence or absence of traffic congestion, the shape of a road, the weather information, and the number of vehicles capable of traveling in a convoy included in the traffic condition information. The standard setting unit 14 generates standard information for platooning using at least one information of the degree of congestion, the presence or absence of traffic congestion, the shape of a road, the weather information, and the number of vehicles capable of traveling in a convoy (step S105). The standard setting unit 14 may generate standard information for platooning by using at least one information of the degree of congestion, the presence or absence of traffic congestion, the shape of a road, the weather information, and the number of vehicles capable of traveling in a convoy, and at least one information of the platooning section and the time to implement platooning. The standard information for platooning shows a value indicating whether platooning can be permitted, the number of vehicles performing platooning that can be permitted (the number of vehicles capable of traveling in a convoy), a length of platooning that can be permitted, and the like. More specifically, as an example, the standard setting unit 14 inputs information used to generate standard information among the degree of congestion, the presence or absence of traffic congestion, the shape of a road, the weather information, the platooning section, and the time to implement platooning to a standard information generation module generated by machine learning or the like, and obtains standard information as an output. Alternatively, the standard setting unit 14 may identify standard information in accordance with information used to generate standard information on the basis of a data table indicating a corresponding relationship between: the information used to generate the standard information among the degree of congestion, the presence or absence of traffic congestion, the shape of a road, the weather information, the platooning section, and the time to implement platooning; and the standard information. The implementation/non-implementation determination unit 15 acquires the standard information from the standard setting unit 14.

The processing of the traffic condition acquisition unit 13 and the standard setting unit 14 described above may be performed in advance. For example, the traffic condition acquisition unit 13 sequentially acquires predicted traffic condition information for each predetermined section of each road in a predetermined area (for example, nationwide) and for each future time zone. Then, the standard setting unit 14 identifies standard information for each traffic condition information predicted for each predetermined section of each road in the predetermined area and for each future time zone, acquired by the traffic condition acquisition unit 13. This standard information is recorded in advance in the standard information database for each predetermined section of each road in the predetermined area and for each future time zone. Then, the implementation/non-implementation determination unit 15 may read the platooning section included in the application information and the standard information recorded in the standard information database in association with the time to implement platooning, and start processing of determining whether to permit the implementation of platooning. The standard setting unit 14 outputs the standard information to the implementation/non-implementation determination unit 15.

The implementation/non-implementation determination unit 15 acquires the standard information from the standard setting unit 14. The implementation/non-implementation determination unit 15 compares the standard information with a comparison target item included in the application information of platooning received in step S102, and determines whether platooning can be implemented (step S106). For example, it is assumed that the standard information includes a value indicating whether platooning can be permitted and the number of vehicles performing platooning that can be permitted. It is also assumed that the comparison target item included in the application information is the number of platooning vehicles. In this case, if the value indicating whether platooning can be permitted included in the standard information indicates that the platooning can be permitted, and the number of platooning vehicles of the comparison target item included in the application information is set to the number of vehicles or less performing platooning that can be permitted, included in the standard information, the implementation/non-implementation determination unit 15 determines that implementation of platooning for this application is possible. The implementation/non-implementation determination unit 15 instructs the implementation permission unit 16 to perform processing when it is determined that the implementation of platooning identified in the application information is possible.

When it is determined that the implementation of platooning identified in the application information is possible, the implementation permission unit 16 stores the application information stored in the application table in an implementation schedule table, and deletes the application information from the application table (step S107). As a result, the implementation permission unit 16 can permit the implementation of platooning. The implementation permission unit 16 instructs the application information reception unit 12 to transmit a result of the determination indicating that the implementation of platooning identified in the application information has been determined to be possible or that the implementation has been determined to be impossible to the terminal 3. The application information reception unit 12 transmits information regarding a determination result page indicating a result of the determination to the terminal 3 (step S108).

The terminal 3 displays the determination result page on the monitor. If a result of the determination described on the determination result page is that the implementation is not possible, the applicant who has instructed transmission of the application information can modify contents of the application and perform pressing a reapplication button. Then, the terminal 3 transmits a retransmission request of the application registration web page to the vehicle management device 1. The application information reception unit 12 of the vehicle management device 1 retransmits the application registration web page to the terminal 3. After that, the applicant can transmit the application information with modified contents to the vehicle management device 1 using the terminal 3 in the same manner as described above.

According to the above processing, the vehicle management device 1 can determine whether the implementation of platooning requested by the applicant is possible on the basis of the application information received from the terminal 3. Since the vehicle management device 1 determines whether the implementation is possible on the basis of a traffic condition in accordance with a time and a platooning section in which platooning is performed, it is possible to appropriately determine whether the implementation of platooning of vehicles is possible and manage the platooning. That is, the vehicle management device 1 can limit the implementation of platooning in accordance with a traffic condition, and can contribute to preventing occurrence of an accident and worsening of traffic congestion.

Figure 6:
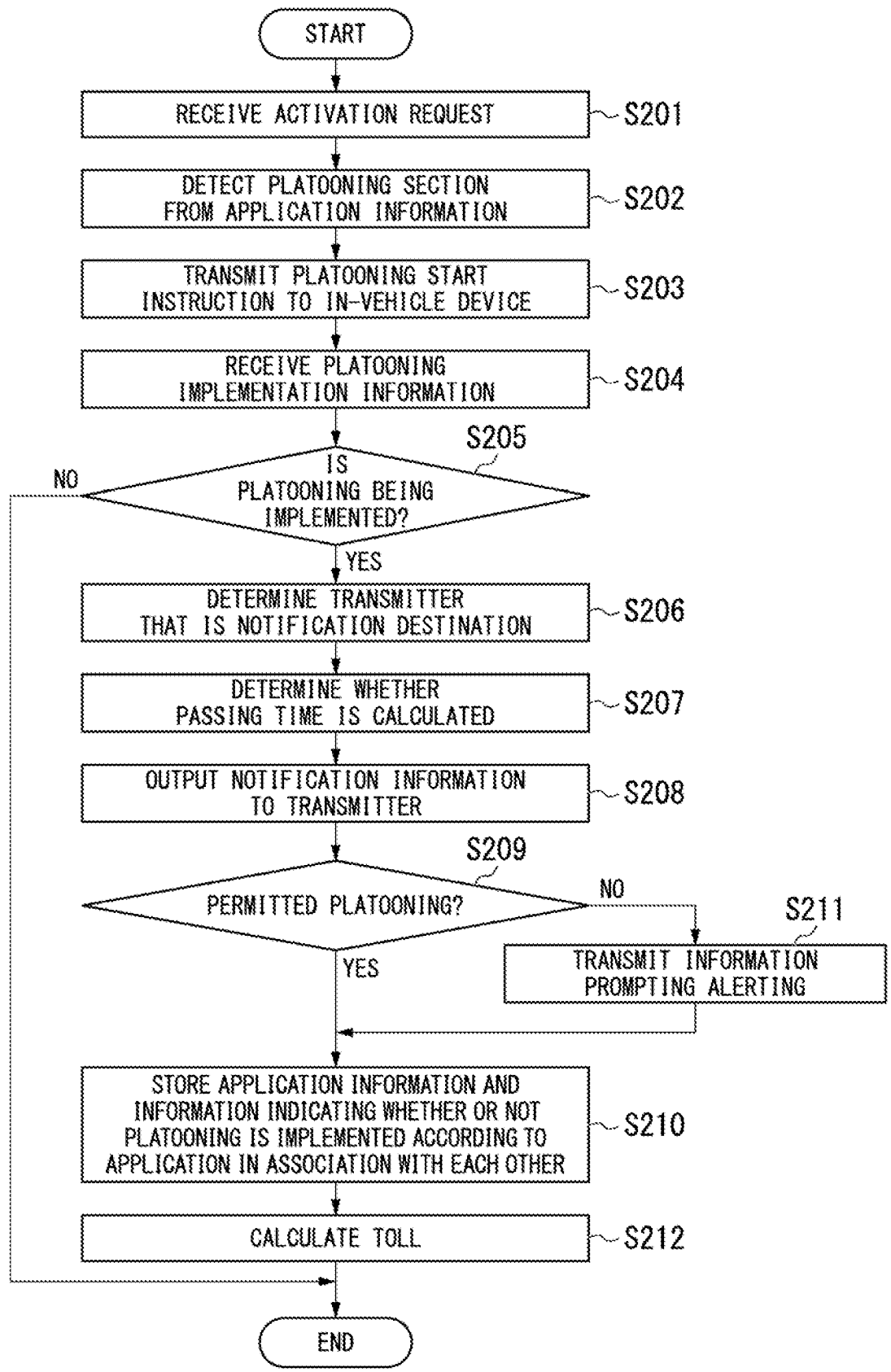
FIG. 6 is a second diagram which shows a processing flow of the vehicle management device according to the example embodiment of the present invention.

FIG. 6 is a second diagram which shows a processing flow of the vehicle management device 1.

Next, management processing for platooning by the vehicle management device 1 will be described.

As an example, this example embodiment will be described using an example in which a plurality of vehicles 4 form a convoy in a predetermined dedicated area provided in a service area of an expressway or the like. For example, each of the plurality of vehicles 4 enters the expressway from different entrances and arrives at a dedicated area of a predetermined service area.

A driver of each vehicle 4 drives a vehicle 4 that he or she is in charge in the dedicated area, and moves the vehicle 4 to a position of the convoy for the vehicle 4 to implement the platooning identified in the application information (a position based on a predetermined order in the convoy). The driver operates the in-vehicle device 40 provided in the vehicle 4 to instruct a start of the processing for implementing the plating. At this time, the in-vehicle device 40 starts start control of platooning under control from the vehicle management device 1. In this case, the in-vehicle device 40 transmits a platooning control activation request including information for identifying a convoy, such as an applicant number, an in-vehicle device ID, the number described on a license plate of the vehicle 4, the platooning section, the time to implement platooning, the number of platooning vehicles, and an order in a convoy, to the vehicle management device 1.

The vehicle management device 1 receives an activation request (step S201). If an activation request is received, the implementation permission unit 16 of the vehicle management device 1 identifies application information of platooning corresponding to the activation request from the implementation schedule table stored in the database 104 on the basis of a combination of various types of information included in the activation request. The implementation permission unit 16 detects a platooning section from the application information of platooning (step S202). The implementation permission unit 16 acquires lane map information of the detected platooning section and line marker information from the database 104. The lane map information includes, for example, information based on a road design, such as a position of a road installation such as a sign, a position of a road center line, the number of lanes and a curvature of a curve according to the position. The line marker information is, for example, information that holds each ID and position information of a large number of markers embedded in a road in the platooning section at predetermined intervals. Then, the implementation permission unit 16 transmits a platooning start instruction including lane map information and line marker information to the in-vehicle device 40 that is a transmission source of an activation request (step S203). The in-vehicle device 40 may detect the platooning section by using the lane map information or the line marker information when platooning is being implemented. The processing is a form of processing of transmitting, by the implementation permission unit 16, information for activating a platooning control function provided in the vehicle 4 to the vehicle 4 when it is determined that the implementation of platooning is possible as a result of determination of whether the implementation is possible. The in-vehicle device 40 receives a platooning start instruction and starts controlling the platooning on the basis of the instruction.

Then, the driver gets into a vehicle 4 positioned at a head of platooning and drives the vehicle 4 manually or automatically, and a following vehicle 4 travels while maintaining a distance from a vehicle 4 positioned immediately before in the convoy. Moreover, the in-vehicle device 40 receives a signal transmitted from the roadside machine 2 when the vehicle 4 passes through the roadside machine 2 while traveling in a convoy. The in-vehicle device 40 performs communicative connection to the roadside machine 2 or the vehicle management device 1 based on a reception of a signal transmitted from the roadside machine 2.

The in-vehicle device 40 may receive application information from the vehicle management device 1 in advance or by an operation of a driver after the formation of a convoy is completed. The implementation permission unit 16 of the vehicle management device 1 receives an application information transmission request from the in-vehicle device 40 before the application information is transmitted to the in-vehicle device 40. This application information transmission request includes information for identifying a convoy such as the applicant number, the in-vehicle device ID, a number of a vehicle 4, the platooning section, the time to implement platooning, the number of vehicles 4 that perform platooning, and the order in the convoy. The implementation permission unit 16 determines whether the application information including these types of information is included in the implementation schedule table stored in the database 104. When the implementation schedule table includes application information that holds a set of information included in an application information transmission request, the implementation permission unit 16 transmits the application information to the in-vehicle device 40. As a result, the in-vehicle device 40 can store the application information.

The driver may or may not get in a following vehicle 4 other than the vehicle 4 traveling at the head of the platooning. However, when the driver does not get in the following vehicle 4 other than the leading vehicle 4, it is assumed that the driver is waiting for driving the vehicle 4 that the driver does not get in in a dedicated area for canceling the convoy indicating an end point of a traveling section in which platooning is performed. Vehicles 4 constituting the platooning may exit the expressway from different exits and travel to different destinations.

Here, it is assumed that formation of a convoy is finished and platooning is started. Then, if the in-vehicle device 40 receives a signal of the roadside machine 2 installed on a roadside of the expressway, the in-vehicle device 40 performs communicative connection to the roadside machine 2. The in-vehicle device 40 transmits plating implementation information including an in-vehicle device ID to the roadside machine 2. If each platooning vehicle 4 passes in front of the roadside machine 2, the roadside machine 2 can sequentially acquire platooning implementation information from the in-vehicle device 40 of each vehicle 4. The platooning implementation information may include an in-vehicle device ID of the in-vehicle device 40 of another vehicle 4 traveling in front, which is received by the in-vehicle device 40 according to vehicle-to-vehicle communication from the other in-vehicle device 40 mounted in the vehicle 4 traveling in front in a convoy. The platooning implementation information may include time information when the in-vehicle device 40 has transmitted the platooning implementation information and time information when the roadside machine 2 has received the in-vehicle device ID. The roadside machine 2 transmits the platooning implementation information to the vehicle management device 1.

The vehicle management device 1 receives platooning implementation information from the roadside machine 2 (step S204). The monitoring unit 17 of the vehicle management device 1 sequentially acquires the plating implementation information transmitted by the in-vehicle device 40 of each platooning vehicle 4. The convoy vehicle detection unit 171 outputs a vehicle ID and time information included in each piece of the platooning implementation information to the platooning detection unit 172. Based on the vehicle ID, the platooning detection unit 172 acquires application information including the vehicle ID from the implementation schedule table included in the implementation schedule table of the database 104. The platooning detection unit 172 determines whether each in-vehicle device ID included in the acquired platooning implementation information matches an in-vehicle device ID included in each piece of the acquired plurality of application information. In addition, the platooning detection unit 172 determines whether each piece of platooning implementation information including each of the plurality of in-vehicle device IDs identified from the application information has been received by the roadside machine 2 within a predetermined time predicted to be required for the platooning to pass in front of the roadside machine 2. The platooning detection unit 172 determines whether the platooning is being implemented on the basis of these determinations (step S205).

If platooning implementation information has been received by the roadside machine 2 within the predetermined time expected to be required for the platooning to pass in front of the roadside machine 2, the platooning detection unit 172 determines that the platooning is being implemented. The platooning detection unit 172 may determine that the platooning is being implemented when the number of times platooning implementation information has been received by the roadside machine 2 within a predetermined time predicted to be required for the platooning to pass in front of the roadside machine 2 is a predetermined number or more.

When platooning is being implemented, the platooning detection unit 172 instructs the determination unit 175 to start processing of determining the transmitter 5 that serves as a notification destination. The platooning detection unit 172 outputs each piece of platooning implementation information received from the in-vehicle device 40 of the vehicles 4 constituting a convoy to the determination unit 175. The database 104 of the vehicle management device 1 stores a position data table that holds a corresponding relationship between an ID of the roadside machine 2 and position information of a position in which the roadside machine 2 is installed in advance. The determination unit 175 acquires the ID of the roadside machine 2 from each piece of platooning implementation information, and reads the position information associated with the ID from the position data table. The determination unit 175 detects the read position as a position of each platooning vehicle 4 in the convoy. The vehicle management device 1 stores a notification destination table that holds a corresponding relationship between the position information of the convoy and a desired transmitter 5 to which notification information needs to be transmitted when the convoy has passed the position in the database 104 in advance. The determination unit 175 acquires the ID of the transmitter 5 which serves as a notification destination according to a position in the convoy from the notification destination table. The determination unit 175 determines a transmitter 5 indicated by the acquired ID as the transmitter 5 that is a notification destination (step S206). The determination unit 175 outputs the ID and position information of the transmitter 5 that is a notification destination and the position information of a convoy to the passing time calculation unit 176.

The determination unit 175 may determine, on the basis of the traveling position of the convoy, a platooning notification device such as the transmitter 5 installed behind the traveling position in the traveling direction of platooning as a request destination for requesting the output of notification information.

In addition, the determination unit 175 may identify another second road that joins the first road passing through the traveling position, and determine a platooning notification device such as a transmitter 5 or the like installed on the second road as a request destination for requesting the output of notification information.

The passing time calculation unit 176 determines whether to calculate a passing time on the basis of the position of a transmitter 5 that is a notification destination and the position information of the convoy (step S207). For example, the passing time calculation unit 176 determines that the passing time is calculated when the position of a transmitter 5 that is a notification destination is positioned ahead of the position of a convoy in the traveling direction of the convoy. When a passing time is calculated, the passing time calculation unit 176 calculates a distance on the basis of the position of a transmitter 5 that is a notification destination and the position information of the convoy. The passing time calculation unit 176 calculates a time at which the convoy passes through the position of a transmitter 5 that is a notification destination on the basis of the distance and a predetermined legal speed. For example, by dividing the distance between the position of a transmitter 5 that is a notification destination and the position information of a convoy by the legal speed, a time until the convoy passes through the transmitter 5 that is a notification destination is calculated, and the passing time is calculated by adding the calculated time to a current time. The passing time calculation unit 176 outputs an output request including the ID of a transmitter 5 that is a notification destination and the passing time to the request unit 177. When it is determined that the passing time is not calculated, the passing time calculation unit 176 outputs an output request including the ID of a transmitter 5 that is a notification destination to the request unit 177. Then, the request unit 177 outputs notification information to the transmitter 5 on the basis of the ID of the transmitter 5 that is a notification destination (step S208). The notification information may include a passing time included in an output request. The notification information may include voice data indicating that the convoy will pass, the number of vehicles 4 constituting the convoy, and the like.

The transmitter 5 that is a notification destination receives the notification information. The transmitter 5 wirelessly outputs the notification information. The notification information output by the transmitter 5 using a wireless signal is received by the in-vehicle device 40 of the vehicle 4. The in-vehicle device 40 outputs warning information indicating that a convoy will pass on the basis of the notification information. When voice data is included in the notification information, the in-vehicle device 40 may output the voice data from a speaker. The in-vehicle device 40 may output a character string (passing time, character information indicating the number of passing vehicles) indicated by the notification information of the monitor.

By the above processing, the vehicle management device 1 determines a platooning notification device such as a transmitter 5 which is an output destination of notification information on the basis of the traveling position of a convoy performing platooning, and requests the platooning notification device to output notification information regarding the convoy. The platooning notification device such as the transmitter 5 outputs notification information to the vehicle 4 in the vicinity of the own device. As a result, the vehicle management device 1 can alert desired other vehicles according to the position of the platooning that platooning is being implemented.

In the example of processing described above, a mode when the platooning notification device is the transmitter 5 has been described. However, the platooning notification device may be an electric bulletin board installed on a road side of a road or above a vehicle traffic position of the road, or may be a communication device or display device other than this. When the platooning notification device is an electric bulletin board, the electric bulletin board displays a time at which a convoy passes and a character string indicating that there is a danger due to passage of platooning. Moreover, the platooning notification device may be a traffic light provided on an inflow road from an IC (interchange) or an SA (service aria)/PA (parking aria) to a main line of an expressway. In this case, the vehicle management device 1 may output notification information to the traffic light, and the traffic light may limit an inflow of other vehicles to the main line while platooning vehicles are passing through an injunction of the inflow road and the main line.

When platooning is being implemented in step S205 described above, the platooning detection unit 172 determines whether the platooning is platooning permitted on the basis of the application information (step S209). The platooning detection unit 172 determines that the platooning permitted by application information is being implemented when a number matches each in-vehicle device ID included in each information in a comparison between the platooning implementation information and the application information, and each piece of the platooning implementation information has been received by the roadside machine 2 within a predetermined time. Moreover, the platooning detection unit 172 may determine an order of platooning on the basis of the in-vehicle device ID of the in-vehicle device 40 of a vehicle 4 traveling in front, which is included in the platooning implementation information, determine whether the platooning is organized in the order shown in the application information, and determine that platooning permitted by the application information is being implemented when it is organized in the order.

The platooning detection unit 172 similarly determines whether the platooning permitted by the application information is being implemented on the basis of the platooning implementation information acquired from all the roadside machines 2 in the platooning section included in the application information. When the platooning detection unit 172 determines that the platooning permitted by the application information is being implemented on the basis of the platooning implementation information obtained from all roadside machines 2 in the platooning section, it outputs the application information and information indicating that platooning is being implemented according to the application to the performance storage unit 174. When the platooning detection unit 172 determines that the platooning permitted by the application information is not being implemented on the basis of the platooning implementation information obtained from a certain roadside machine 2 among the platooning implementation information obtained from all the roadside machines 2 in the platooning section, it outputs the application information and information indicating that platooning is not being implemented according to the application to the performance storage unit 174. The performance storage unit 174 associates the application information with the information indicating whether or not platooning is being implemented according to an application, and writes them in a performance storage table of the database 104 (step S210). This makes it possible to store whether platooning included in the application information has been implemented.

The platooning detection unit 172 outputs the application information that identifies platooning that is determined not to be implemented according to an application to the alerting unit 173. When it is determined that platooning is not being implemented according to an application, the alerting unit 173 transmit information prompting alerting due to a fact that platooning is not being implemented to the terminal 3 that has transmitted the application information of the platooning (step S211). The terminal 3 outputs information prompting alerting to a monitor or the like. As a result, the applicant can detect that platooning is not being implemented according to an application. In addition, the alerting unit 173 detects the in-vehicle device ID of a vehicle 4 at the head of the platooning on the basis of the application information that identifies platooning that is not being implemented according to an application. The alerting unit 173 may transmit the alerting information to an in-vehicle device 40 indicated by the detected in-vehicle device ID. As a result, it is possible to notify a driver of a vehicle 4 constituting platooning that the platooning is not being implemented according to an application. The vehicle management device 1 and the in-vehicle device 40 can be connected via a public communication network such as the Internet or a mobile phone line, and the vehicle management device 1 can transmit information directly to the in-vehicle device 40.

The platooning detection unit 172 may receive order determination information from the roadside machine 2 in order to detect an order of platooning, and determine whether the order of platooning is according to an application. For example, the roadside machine 2 transmits a predetermined order detection signal to an in-vehicle device 40 among in-vehicle devices 40 of vehicles constituting the platooning, which has been communicatively connected first. The in-vehicle device 40 stores an in-vehicle device ID for identifying the own device (the in-vehicle device 40) in the order detection signal, and transmits the order detection signal to the in-vehicle device 40 of a vehicle 4 traveling immediately after the vehicle 4 in which the in-vehicle device 40 is mounted by vehicle-to-vehicle communication. Similarly, the in-vehicle device 40 of a following vehicle 4 also stores the in-vehicle device ID for identifying the own device in a storage area next to the in-vehicle device ID already written in the order detection signal. In-vehicle devices 40 of subsequent vehicles 4 perform the processing in the similar manner. Then, the in-vehicle device 40 of the rearmost vehicle 4 among the vehicles 4 constituting the platooning similarly stores the in-vehicle device ID of the own device in the order detection signal, and then transmits the order detection signal to the roadside machine 2. The roadside machine 2 acquires the in-vehicle device IDs in an order of storage from the received order detection signal, and generates order determination information holding each in-vehicle device ID without changing the order. The roadside machine 2 transmits the order determination information to the vehicle management device 1. The vehicle management device 1 receives the order determination information. Then, the platooning detection unit 172 of the vehicle management device 1 determines that platooning is being implemented according to an application when in-vehicle device IDs and a storage order thereof are the in-vehicle device IDs and the order included in the application information.

The toll calculation unit 18 acquires application information associated with the information indicating that platooning has been implemented according to an application written in the performance storage table. The toll calculation unit 18 calculates a toll based on a fact that platooning is being implemented according to an application (step S212). This toll may be a discounted value compared to a normal toll. The toll calculation unit 18 may generate billing information in accordance with the calculated toll and transmit it to the terminal 3. The applicant makes a payment based on the calculated toll.

According to the processing described above, the vehicle management device 1 can confirm whether platooning is being implemented according to an application. Moreover, the vehicle management device 1 can calculate a discounted toll based on the implementation of platooning.

Figure 7:
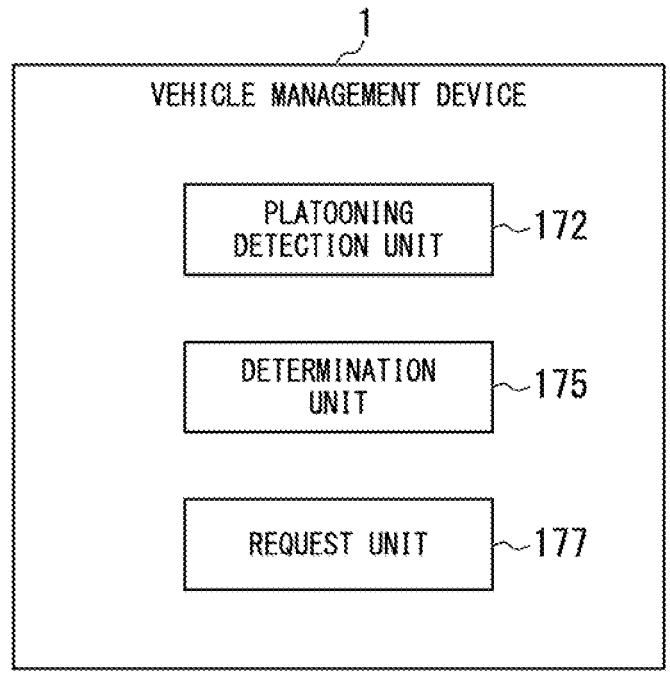
FIG. 7 is a diagram which shows a configuration of a vehicle management device according to another example embodiment of the present invention.

FIG. 7 is a diagram which shows a configuration of the vehicle management device according to an example embodiment of the present invention.

Figure 8:
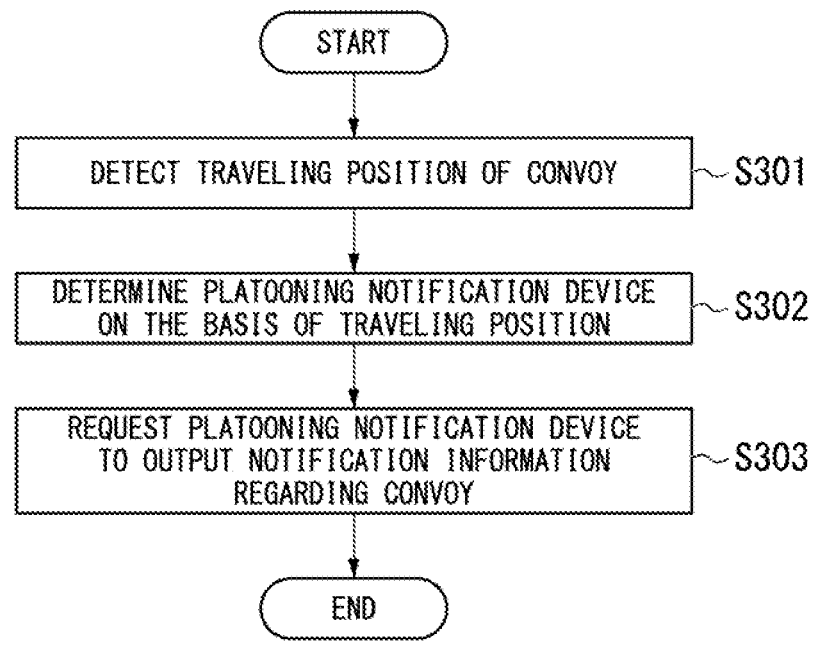
FIG. 8 is a diagram which shows a flowchart corresponding to the vehicle management device shown in FIG. 7.

FIG. 8 is a diagram which shows a flowchart corresponding to the vehicle management device shown in FIG. 7.

The vehicle management device 1 includes at least the platooning detection unit 172, the determination unit 175, and the request unit 177.

Then, the platooning detection unit 172 of the vehicle management device 1 detects the traveling position of a convoy of the platooning in which a plurality of vehicles travel line up (step S301). Moreover, the determination unit 175 determines a platooning notification device on the basis of the traveling position (step S302). Then, the request unit 177 requests the platooning notification device to output notification information regarding the convoy (step S303).

As a result, the vehicle management device 1 can alert desired other vehicles according to the position of the platooning that the platooning is being implemented.

Each of the devices described above has a computer system therein. A process of the processing described above is stored in a computer-readable storage medium in a form of a program, and the processing described above is performed by a computer reading and executing this program. Here, the computer-readable storage medium refers to a magnetic disk, a magneto-optical disc, a CD-ROM, a DVD-ROM, a semiconductor memory, or the like. In addition, this computer program may be distributed to the computer via a communication line so that the computer that has received this distribution executes the program.

In addition, the program described above may be for realizing a part of the functions described above. Furthermore, it may be a so-called difference file (a difference program) that can realize the functions described above in combination with a program already recorded in the computer system.

This application is based upon and claims the benefit of priority from Japanese patent application No. 2019-018091, filed Feb. 4, 2019, the disclosure of which is incorporated herein in its entirety by reference.

INDUSTRIAL APPLICABILITY

The present invention may be applied to a vehicle management device, a vehicle management method, and a storage medium.

REFERENCE SYMBOLS

1 Vehicle management device
2 Roadside machine
3 Terminal
4 Vehicle
11 Control unit (Control means)
12 Application information reception unit (Application information reception means)
13 Traffic condition acquisition unit (Traffic condition acquisition means)
14 Standard setting unit (Standard setting means)
15 Implementation/non-implementation determination unit (Implementation/non-implementation determination means)
16 Implementation permission unit (Implementation permission means)
17 Monitoring unit (Monitoring means)
18 Toll calculation unit (Toll calculation means)
171 Convoy vehicle detection unit (Convoy vehicle detection means)
172 Platooning detection unit (Platooning detection means)
173 Alerting unit (Alerting means)
174 Performance storage unit (Performance storage means)
175 Determination unit (Determination means)
176 Passing time calculation unit (Passing time calculation means)
177 Request unit (Request means)
40 In-vehicle device

What is claimed is:
1. A vehicle management device comprising:
at least one memory configured to store instructions; and
at least one processor configured to execute the instructions to:
receive application information including first in-vehicle device identification (ID);
receive platooning implementation information transmitted from a roadside machine when the roadside machine detects that a convoy including a plurality of vehicles passes in front of the roadside machine, the platooning implementation information including second in-vehicle device ID;

detect a traveling position that is a position in which the convoy is traveling, when the first in-vehicle device ID matches the second in-vehicle device ID;

receive traffic condition information about the traveling position from a traffic condition distribution server;

implement platooning based on the traffic condition information; and based on platooning being implemented:
identify a platooning notification device based on the traveling position; and
request the platooning notification device to output notification information about the convoy.

2. The vehicle management device according to claim 1, wherein identifying the platooning notification device comprises selecting, from a plurality of platooning notification devices, the platooning notification device installed behind the traveling position of the convoy in a traveling direction.

3. The vehicle management device according to claim 1, wherein identifying the platooning notification device comprises identifying a second road that joins a first road on which the convoy is traveling, and selecting, from a plurality of platooning notification devices, the platooning notification device installed on the second road.

4. The vehicle management device according to claim 3, wherein the at least one processor is configured to execute the instructions to obtain a passing time based on the traveling position, the passing time being a time at which the convoy passes through a junction of the first road and the second road, and wherein requesting the platooning notification device comprises requesting the platooning notification device to output the notification information including the passing time.

5. A non-transitory storage medium that stores a program causing a computer to execute:

receiving application information including first in-vehicle device identification (ID);

receiving platooning implementation information transmitted from a roadside machine when the roadside machine detects that a convoy including a plurality of vehicles passes in front of the roadside machine, the platooning implementation information including second in-vehicle device ID;

detecting a traveling position that is a position in which the convoy is traveling when the first in-vehicle device ID matches the second in-vehicle device ID;

receiving traffic condition information about the traveling position from a traffic condition distribution server;

implementing platooning based on the traffic condition information; and based on platooning being implemented:
identifying a platooning notification device based on the traveling position; and
requesting the platooning notification device to output notification information about the convoy.

6. The vehicle management device according to claim 1, wherein the application information includes a first plurality of pieces of first in-vehicle device ID, wherein the platooning implementation information includes a second plurality of pieces of second in-vehicle device ID, and wherein detecting comprises detecting the traveling position when each of the first plurality of pieces of first in-vehicle device ID matches each of the second plurality of pieces of second in-vehicle device ID.

7. A vehicle management method comprising:

receiving application information including first in-vehicle device identification (ID);

receiving platooning implementation information transmitted from a roadside machine when the roadside machine detects that a convoy including a plurality of vehicles passes in front of the roadside machine, the platooning implementation information including second in-vehicle device ID;

detecting a traveling position that is a position in which the convoy is traveling when the first in-vehicle device ID matches the second in-vehicle device ID;

receiving traffic condition information about the traveling position from a traffic condition distribution server;

implementing platooning based on the traffic condition information; and based on platooning being implemented:
identifying a platooning notification device based on the traveling position; and
requesting the platooning notification device to output notification information about the convoy.

* * * * *